3,051,695
PRODUCTION OF POLYMERIC MERCAPTANS
Paul F. Warner, Phillips, and Richard D. Franz, Borger, Tex., assignors to Phillips Petroleum Company, a corporation of Delaware
No Drawing. Filed Oct. 12, 1959, Ser. No. 845,602
10 Claims. (Cl. 260—139)

This invention relates to the preparation of high molecular weight polymeric mercaptans having insecticidal activity. In accordance with one aspect, this invention relates to a process for the preparation of relatively high molecular weight polymeric mercaptans which comprises reacting a diene polymer with hydrogen sulfide ($H_2S$) at elevated temperature and pressure in the presence of a catalyst. In accordance with another aspect, this invention relates to a method of killing insects, such as grasshoppers and roaches, which comprises subjecting an insect to the action of a high molecular weight polymeric mercaptan dispersed in an adjuvant carrier, said mercaptan having been prepared by reacting a diene polymer with $H_2S$ in the presence of a catalyst. In accordance with still another aspect, this invention relates to insecticidal compositions effective for killing grasshoppers and roaches comprising a solution of a diene polymeric mercaptan dispersed in an aqueous carrier containing an emulsifying agent.

An object of the present invention is to provide a novel catalytic process for the preparation of high molecular weight polymeric mercaptans. Another object of the present invention is to provide an effective catalytic process for the preparation of mercaptan derivatives of polybutadiene. A still further object of the present invention is to provide an effective catlytic process for the preparation of mercaptan derivatives of highly unsaturated polymers having insecticidal activity. Another object of this invention is to provide a method for killing insects, such as roaches and grasshoppers. A still further object of the present invention is to provide novel insecticidal compositions.

Other aspects, objects, as well as the several advantages of this invention, will be apparent from a study of the disclosure and the appended claims.

In accordance with the present invention, a novel process is provided for the preparation of a relatively high molecular weight polymeric mercaptan having insecticidal activity which comprises reacting an unsaturated polymer, such as a diene polymer or copolymer, with $H_2S$ at elevated temperature and pressure in the presence of a solid contact catalyst and recovering said mercaptan as a product of the process.

More specifically, in accordance with the present invention, an effective catalytic process is provided for the preparation of a mercaptan derivative of a highly unsaturated diene polymer or copolymer, especially polybutadiene, which comprises passing a polymer of a conjugated diene, such as butadiene, dissolved or dispersed in an inert reaction medium to a reaction zone, contacting said polymer and hydrogen sulfide in said zone at an elevated pressure sufficient to maintain liquid conditions and at an elevated temperature in the order of about 450° F. in the presence of a cobalt molybdate catalyst to form said polymeric mercaptan as a reaction product, and recovering said mercaptan as a product of the process.

Also, in accordance with the present invention, a novel insecticidal composition especially effective for killing grasshoppers and roaches is provided comprising a solution of a high boiling, relatively high, molecular weight polymeric mercaptan dispersed in an aqueous carrier medium and also containing an emulsifying agent, said mercaptan having been prepared by reacting a diene polymer with $H_2S$ at elevated temperature and pressure in the presence of a cobalt molybdate catalyst.

As disclosed above, it has now been found that the diene polymer-hydrogen sulfide reaction, as applied to liquid diene polymers and copolymers, especially liquid polybutadiene, to produce high boiling relatively high molecular weight polymeric mercaptans, is smoothly effected in the presence of a catalyst comprising cobalt molybdate at elevated temperature and pressure. The catalyst is preferably employed in the form of synthetic precipitated alumina gel promoted with cobalt molybdate. Such catalysts have heretofore been used to promote desulfurization reaction of hydrocarbon fractions, such as petroleum gases, vapors, and liquids, but the process of the present invention involves a novel adaptation in the field of polymeric mercaptan synthesis.

The highly unsaturated diene polymers which can be utilized in accordance with the present invention are preferably the liquid polymers and copolymers of conjugated dienes, such as 1,3-butadiene, preferably formed by reaction in the presence of an alkali metal catalyst and a suitable diluent at controlled conditions of temperature and pressure, as is well known in the art, such as disclosed and claimed by U.S. Patent 2,631,175, Willie W. Crouch, patented March 10, 1953. The preferred polymer employed in the present invention is liquid polybutadiene. However, the invention is also applicable to other polymers in which 1,3-butadiene is the essential ingredients. For example, it is applicable to the polymerization of 1,3-butadiene with materials copolymerizable therewith and such materials include other conjugated diolefins, such as isoprene, piperylene, 2,3-dimethyl butadiene, and the like, and vinyl compounds, such as styrene, methyl-substituted styrene, methylvinylpyridine, etc. In all such polymerizations, the measure of polymerizable ingredient is 1,3-butadiene and this component is present in an amount which exceeds 50 weight percent of the monomeric material.

Diene polymers suitable as starting materials of the present invention are relatively high molecular weight polymers having average molecular weights generally in the range from 1,000 to 3,000. These polymers are highly unsaturated and the unsaturation has been found to be in the neighborhood of about 30 double bonds per molecule, if a molecular weight of 2,000 is assumed.

The temperature normally employed for carrying out the polymerization reaction lies in the range from 150° F. to 220° F., preferably about 180° F. to about 200° F. The pressure employed normally ranges from about 5 to about 100 p.s.i.g., preferably about 20 to about 30 p.s.i.g. Also, the polymerization reaction is preferably carried out in the presence of an inert diluent or solvent and an alkali metal catalyst, such as sodium, which is generally employed in the range of from about 0.5 to 5.0 weight percent, preferably 1.0 to 1.5 weight percent. The ratio of solvent to monomer generally employed will range 90:10 to 40:60, preferably 70:30.

The process of the present invention comprises the contacting of controlled proportions of a diene polymer, as described above, preferably dissolved in an inert diluent, and hydrogen sulfide with a cobalt molybdate catalyst under conditions selected to produce a substantial conversion of the polymer to the corresponding mercaptans. The hydrogen sulfide-polymer feed mixture can be passed continuously through a stationary bed of granular catalyst, or otherwise contacted with a solid catalyst, the catalyst effluent may be either continuously or intermittently fractionated to separate reaction diluent and hydrogen sulfide from the product. Ordinarily an excess of hydrogen sulfide is present in the feed which can be returned to the catalyst along with fresh polymer.

In a specific preferred embodiment of the invention, a copolymer of butadiene and methylvinylpyridine, derived from the sodium catalyzed polymerization of butadiene and methylvinylpyridine dissolved in an isoparaffinic diluent (Soltrol 130) in admixture with hydrogen sulfide, is contacted with the cobalt molybdate catalyst under the following conditions; an elevated pressure sufficient to maintain liquid conditions in the reaction zone preferably in the order of about 800 p.s.i.g.; an elevated temperature in the order of about 450° F.; a catalyst comprising cobalt molybdate and alumina gel; and a flow rate of 1 to 10 liquid volumes per volume of catalyst per hour. Under the aforesaid conditions, the principal reaction occurring is apparently addition of $H_2S$ to the olefinic linkages so that at least it is theoretically possible to add one mol of $H_2S$ per butadiene unit in the polymer chain. The average molecular weight of the Butarez polymer (copolymer of butadiene with a small amount of methylvinylpyridine) is about 1,500 or, in other words, 28 mols of butadiene reacted to make 1 mol of Butarez. Theoretically, 28 mols of $H_2S$ are capable of reacting with each molecule of polymer.

The total effluent from the reaction zone is treated by conventional means for recovery of hydrogen sulfide. Operation according to the above-described scheme can be either batch-wise or continuous, with the latter usually preferred. A plurality of catalyst cases can be provided in order to maintain uninterrupted operation during catalyst replacement or regeneration procedure. The hydrogen sulfide can be pre-dissolved in the polymer charge or other means of introduction to the reaction zone can be employed.

The reaction of the diene polymer and hydrogen sulfide is preferably carried out in the presence of an inert reaction diluent, such as an isoparaffinic fraction boiling in the range 260° F. to 800° F. Other solvents or diluents which can be employed by the practice of the present invention comprise: Paraffinic hydrocarbons, especially the light normally liquid paraffins, such as pentanes, hexanes, heptanes, and certain naphtha fractions; cycloparaffins, such as cyclohexane; aromatic hydrocarbons, such as benzene, toluene, or other lower alkyl benzenes; and the like.

The final step in the process of this invention comprises recovery of the polymeric mercaptan by an appropriate treating process wherein the hydrogen sulfides are removed or converted to inactive materials which do not produce deleterious effects on the product. One method by which recovery of the polymeric marcaptan can be effected comprises treatment of the reaction product by purging with air at reduced pressure to strip-out unreacted $H_2S$. Other known separations or treatments can be employed for the recovery of the product depending upon the ultimate use of the material and the degree of refinement required or desired.

As disclosed above, we have also found that the polymeric mercaptans produced according to the present invention exhibit insecticidal activity. The polymeric mercaptan reaction product obtained from the process described above can be subjected to any well known separation so as to obtain a substantially pure product as the insecticidal ingredient or the reaction product can be purged with air at reduced pressure, etc., as described above, to remove unreacted materials, especially $H_2S$, dried, and then utilized as the insecticidal ingredient.

Insecticides of the present invention can be advantageously employed in any of the forms in which insecticides are commonly employed, such as solutions, emulsions, aerosols, wettable powders, and the like. Well known dispersing agents can be used when preparing emulsions with water or other immiscible liquids and the resulting compositions employed as sprays. One convenient method for the preparation of aqueous suspension of the present insecticides is to dissolve the polymeric mercaptan insecticidal ingredient in a solvent, such as an isoparaffinic fraction, which is immiscible with water, add a surface active agent and, finally, water.

When applying the insecticides of this invention in a solvent or adjuvant carrier medium, the lower effective limit of the insecticidal ingredient concentration is about 0.1 weight percent. Generally, it is advantageous to make application of the insecticide in a manner so as to deposit from about 1–10 grams of the active ingredient on each 100 square feet of surface. However, larger or smaller amounts can be applied, as desired, although it is generally neither economical to employ larger amounts nor efficient because of short insecticidal action to employ smaller amounts. The polymeric mercaptans of the present invention are advantageously dispersed in a carrier medium, such as water, with an emulsifying agent.

In using the active insecticidal materials of the present invention, they may be applied in undiluted form, as concentrates, or in high dilution. They may be applied in undiluted form or as a concentrate with the assistance of fog or similar apparatus to trees and other plants, as well as to other bases frequented by insects. Because of their effectiveness and to lessen cost and to facilitate distribution of a small amount of material necessary to obtain the desired insecticidal results, they are, as a practical matter, usually applied in admixture with a carrier, preferably water. However, other carriers, such as mineral oils, organic solvents or other solvents or suspending agents can be used. Also, the concentrates or diluted compositions of the present invention may also contain other insecticidal, miticidal and fungicidal agents, if desired. For general use on plants, for example, to combat grasshoppers and the like, the insecticidal ingredient is usually employed as a water emulsion. Also, any emulsifier desired can be used to hold the polymeric mercaptan in suspension.

The usefulness of the compositions of the present invention, the general method of application and a method of their preparation will be illustrated in the following examples.

EXAMPLE I

A liquid diene copolymer (Butarez-B) of butadiene and methylvinylpyridine was prepared by reacting butadiene and methylvinylpyridine in the temperature range of 190° F. to 200 °F., using dispersed sodium as the catalyst and an isoparaffinic hydrocarbon fraction (Soltrol 130) as the reaction medium. The monomers were premixed in a cylinder, then fed to the synthesis unit containing reaction medium nad dispersed sodium. The copolymer product obtained contained 3.5 weight percent methylvinylpyridine (2-methyl-5-vinylpyridine).

The reaction product obtained was quenched with methanol (100 percent excess based on sodium) to convert sodium and sodium-organo compounds to sodium methylate and then carbon dioxide gas was added to convert sodium methylate to sodium methyl carbonate. The product then was removed by filtration or it can be removed by washing with hot water. The polymer product was then recovered by flashing off the solvent at about 300° F. and at reduced pressure.

EXAMPLE II

A Butarez mercaptan was prepared by reacting the purified polymer product obtained in Example I with hydrogen sulfide at elevated temperature and pressure in the presence of a cobalt molybdate catalyst.

Data from the Butarez mercaptan run are as follows:

| Charge | Pounds | Mols |
|---|---|---|
| Butarex B, 63.5 wt. percent in Soltrol 130[1] | 3.72 | |
| Butarez B, 100 percent | 2.36 | [2]0.041 |
| H$_2$S | 2.91 | 0.086 |
| H$_2$S/Butene Unit mol ratio | 2.1 | |

[1] Contains 3.5 wt. percent MVP.
[2] Calculated as butene units.

Catalyst:
  Cobalt molybdate (Houdry).
  Catalyst was ground and screened to 10 to 20 mesh.
  Composition: 3.0 wt. percent CoO; 7.5 wt. percent MoO$_3$; 89.5 wt. percent Al$_2$O$_3$.

Conditions:
  Temperature, °F. ———————————— 450
  Pressure, p.s.i.g. ———————————— 800
  Rate, v./v./hr. ———————————— 1

In the preceding run, the Butarez polymer reaction diluent (Soltrol 130) and H$_2$S were pre-mixed in a cylinder and passed over cobalt molybdate catalyst at the conditions shown above. The catalyst case was a ¾ inch O.D. by 4 feet long stainless steel tube and contained 300 ml. of catalyst.

The reaction product or effluent removed from the catalyst case was a dark brown oil and it was treated by purging with air at reduced pressure to strip out unreacted H$_2$S. Sulfur analysis showed that the Butarez mercaptan obtained contained 3.15 weight percent sulfur on a solvent-free basis.

EXAMPLE III

Tests were carried out utilizing the Butarez mercaptan product obtained in Example II to determine its effectiveness in killing grasshoppers and roaches.

Compositions comprising 0.5 weight percent of the Butarez mercaptan product of Example II dissolved in Soltrol 130 and emulsified in water containing emulsification agent were used in these tests. Similar tests were carried out with the Butarez polymer and the control.

Procedures used in these tests were as follow: cardboard quart containers with one side cut away and covered with screen wire were used in the grasshopper tests. Ten grasshoppers were placed in each container. Grass and a small tree branch were added to each container to provide food and perching space for the grasshoppers. Fresh grass was added each day during the tests.

Large beakers (1,000 cc.) were used in the roach tests. A thin layer of Vaseline was applied near the top of the beaker to prevent the roaches from escaping, and roaches were placed into each beaker. A small portion of cat food was also placed in each beaker as food for the roaches.

The materials were applied as emulsions in water sprayed directly into the container wetting the insects and container walls, as well as the grass and cat food. One container of grasshoppers was left unsprayed as a control for each run. Observed mortality rates were recorded after one day, two days and three days.

*Table I*

| | Percent Kill | | |
|---|---|---|---|
| | 1 Day | 2 Days | 3 Days |
| Grasshoppers: | | | |
|   Butarez-B[1] | 40 | 60 | |
|   Butarez mercaptan[1] | 30 | 90 | |
|   Control | 5 | 25 | |
| Roaches: | | | |
|   Butarez mercaptan[2] | 48 | 54 | 80 |
|   Control | 0 | 0 | 0 |

[1] The water emulsion used contained 0.5 weight percent solution of polymer in Soltrol 130, or 0.315 weight percent polymer.
[2] Average of two runs: 10 roaches were used in one test and three in the other. The kill was 100 percent in three days in the latter case.

The effectiveness of the polymeric mercaptans of the present invention is clearly shown by the above table.

Although the invention has been described primarily in connection with employing a reaction product, as described in Example II, as an insecticidal ingredient, it should be realized that a pure diene polymeric mercaptan can also be utilized in the practice of the present invention.

Also, cobalt molybdate catalysts containing varying amounts of cobalt molybdate can be employed for the production of the polymeric mercaptans of the present invention. The broad range of cobalt molybdate in the catalyst can range from about 5 to about 50 weight percent, the balance being a carrier, preferably alumina (Al$_2$O$_3$); however, cobalt molybdate amounts outside the above range can be utilized, if desired. The catalyst can be prepared by any method known in the art. One particularly suitable method commonly employed is to precipitate the cobalt molybdate in the presence of an alumina gel, and then activate the catalyst by heating.

Reasonable variation and modification are possible within the scope of the foregoing disclosure and appended claims to the invention, the essence of which is that certain relatively high molecular weight polymeric mercaptans can be effectively prepared by reacting a diene polymer or copolymer, such as polybutadiene, with hydrogen sulfide at elevated temperature and pressure in the presence of a cobalt molybdate catalyst and that the polymeric mercaptan product obtained, as defined, has been found to be insecticidal in character.

We claim:
1. A process for preparing a polymeric mercaptan which comprises reacting a liquid diene polymer in an inert liquid reaction medium with hydrogen sulfide at an elevated temperature up to about 450° F. and a pressure sufficient to maintain liquid phase conditions in the presence of a cobalt molybdate catalyst to form said mercaptan, and recovering said polymeric mercaptan as a product of the process.

2. A process according to claim 1 wherein said polymer is a copolymer comprised principally of butadiene and a minor amount of methylvinylpyridine.

3. A process according to claim 1 wherein said polymer is liquid polybutadiene.

4. A process according to claim 1 wherein said inert liquid reaction medium is an isoparaffin hydrocarbon fraction boiling in the range of about 260° F. to about 800° F. and being derived from the alkylation of isoparaffins with olefins.

5. A process for preparing a relatively high molecular weight high boiling polymeric mercaptan which comprises passing a highly unsaturated liquid polymer of a conjugated diene having a molecular weight ranging from 1,000 to 3,000 in an inert liquid reaction medium and hydrogen sulfide to a reaction zone, contacting said polymer and said hydrogen sulfide at an elevated temperature up to about 450° F. and a pressure up to about 800 p.s.i.g. sufficient to maintain liquid conditions in said zone in the presence of a cobalt molybdate catalyst to form said mercaptan, and recovering said mercaptan as a product of the process.

6. A process according to claim 5 wherein said polymer is a copolymer of butadiene and methylvinylpyridine containing about 97 weight percent butadiene.

7. A process according to claim 5 wherein said polymer is liquid polybutadiene.

8. A process according to claim 5 wherein said inert liquid reaction medium is an isoparaffinic hydrocarbon fraction having a boiling range of about 260° F. to about 800° F. and being derived from the alkylation of isoparaffins with olefins.

9. A butadiene-methylvinylpyridine polymeric mercaptan.

10. A polybutadiene mercaptan.

(References on following page)

References Cited in the file of this patent

UNITED STATES PATENTS

| | | |
|---|---|---|
| 2,051,807 | Allen | Aug. 25, 1936 |
| 2,402,586 | Alvarado | June 25, 1946 |
| 2,522,512 | Harman et al. | Sept. 19, 1950 |
| 2,529,355 | Schulze | Nov. 7, 1950 |
| 2,560,421 | Eby | July 10, 1951 |
| 2,592,089 | Warner | Apr. 8, 1952 |
| 2,913,368 | Birum | Nov. 17, 1959 |
| 2,917,429 | Scott | Dec. 15, 1959 |
| 2,960,538 | May et al. | Nov. 15, 1960 |

FOREIGN PATENTS

| | | |
|---|---|---|
| 464,952 | Great Britain | Apr. 28, 1937 |